United States Patent
Lambert et al.

(10) Patent No.: US 11,409,683 B2
(45) Date of Patent: Aug. 9, 2022

(54) SYSTEMS AND METHODS FOR SINGLE-WIRE MULTI-PROTOCOL DISCOVERY AND ASSIGNMENT TO PROTOCOL-AWARE PURPOSE-BUILT ENGINES

(71) Applicant: Dell Products L.P., Round Rock, TX (US)

(72) Inventors: Timothy M. Lambert, Austin, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/131,300

(22) Filed: Dec. 22, 2020

(65) Prior Publication Data
US 2022/0197843 A1 Jun. 23, 2022

(51) Int. Cl.
*G06F 13/40* (2006.01)

(52) U.S. Cl.
CPC ............... *G06F 13/4022* (2013.01)

(58) Field of Classification Search
CPC ............ G06F 13/4282; G06F 13/4022; G06F 13/385; H04L 69/18; H04L 12/40013
USPC ...... 710/110, 315, 105, 305, 311, 100, 11, 8
See application file for complete search history.

(56) References Cited

U.S. PATENT DOCUMENTS

| | | | | |
|---|---|---|---|---|
| 7,660,934 B2* | 2/2010 | McClure | ................. | H04L 12/66 710/311 |
| 8,683,101 B2* | 3/2014 | Ingels | ................. | G06F 13/4286 710/105 |
| 2004/0148472 A1* | 7/2004 | Barroso | .............. | G06F 12/0817 711/141 |
| 2005/0138258 A1* | 6/2005 | Seto | ...................... | G06F 13/409 710/301 |
| 2005/0198246 A1* | 9/2005 | Kegel | ..................... | H04L 43/50 703/21 |

(Continued)

*Primary Examiner* — Faisal M Zaman
(74) *Attorney, Agent, or Firm* — Jackson Walker L.L.P.

(57) ABSTRACT

A method may be provided for a system having a logic device interfaced between a management controller and a plurality of subsystems, wherein the logic device includes a plurality of purpose-built engines, each purpose-built engine configured to perform single-wire communication with one or more subsystems in accordance with a particular protocol associated with such purpose-built engine and a purpose-built engine group switch interfaced between the plurality of purpose-built engines and a plurality of connectors for communicatively coupling the plurality of subsystems to the logic device. The method may include establishing, with a purpose-built engine group switch, a plurality of communication routes based on one or more switch control signals, wherein each route of the plurality of communication routes is established between a respective purpose-built engine and a respective connector. The method may also include monitoring all possible one-wire communication paths between the purpose-built engines and the subsystems for announcements of protocol types. The method may further include in response to such monitoring, communicating the switch control signals to the purpose-built engine group switch in accordance with supported communications protocols of individual purpose-built engines of the plurality of purpose-built engines.

6 Claims, 2 Drawing Sheets

(56) References Cited

U.S. PATENT DOCUMENTS

| | | | |
|---|---|---|---|
| 2007/0124528 A1* | 5/2007 | Blanton | H04L 67/12 |
| | | | 710/315 |
| 2009/0150728 A1* | 6/2009 | Barlow | G06F 11/2294 |
| | | | 714/E11.159 |
| 2009/0279540 A1* | 11/2009 | Van Wageningen | ............ |
| | | | H04L 12/40026 |
| | | | 370/375 |
| 2013/0138854 A1* | 5/2013 | Bandholz | G06F 13/4081 |
| | | | 710/302 |
| 2014/0292384 A1* | 10/2014 | Wu | G05B 19/0423 |
| | | | 327/143 |
| 2016/0124407 A1* | 5/2016 | Kallio | G06F 9/45558 |
| | | | 700/86 |
| 2017/0048085 A1* | 2/2017 | Munoz | H04L 5/0007 |
| 2018/0275905 A1* | 9/2018 | Olarig | G06F 13/4063 |
| 2019/0042348 A1* | 2/2019 | Krithivas | G06F 11/0721 |
| 2019/0182074 A1* | 6/2019 | Muth | H04L 43/00 |
| 2020/0081859 A1* | 3/2020 | Mishra | G06F 13/4291 |

\* cited by examiner

SYSTEMS AND METHODS FOR SINGLE-WIRE MULTI-PROTOCOL DISCOVERY AND ASSIGNMENT TO PROTOCOL-AWARE PURPOSE-BUILT ENGINES

TECHNICAL FIELD

The present disclosure relates in general to information handling systems, and more particularly to methods and systems for providing single-wire multi-protocol discovery and assignment to protocol-aware purpose-built engines within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Single-wire proliferation, or self-describing input/output (SDIO), is a key enabler to high-value, rich, and dense information handling system configuration with maximal flexibility. In existing approaches, a SDIO central manager may statically assign a group of single-wire communication paths to a specific protocol engine in an information handling system. Such approach prohibits coupling of a device with an alternate protocol to any of those single-wire communication paths. A unified SDIO protocol engine capable of supporting all protocols may not be resource optimized and may stress logic capacity of the SDIO central manager.

SUMMARY

In accordance with the teachings of the present disclosure, the disadvantages and problems associated with existing approaches to SDIO in an information handling system may be reduced or eliminated.

In accordance with embodiments of the present disclosure, an information handling system may include a host system comprising a host system processor, a management controller communicatively coupled to the host system processor and a logic device and configured to perform out-of-band management of the information handling system, a plurality of subsystems, each subsystem configured to perform a particular functionality of the information handling system, and a logic device interfaced between the management controller and the plurality of subsystems. The logic device may comprise a plurality of purpose-built engines, each purpose-built engine configured to perform single-wire communication with one or more subsystems in accordance with a particular protocol associated with such purpose-built engine, a purpose-built engine group switch interfaced between the plurality of purpose-built engines and a plurality of connectors for communicatively coupling the plurality of subsystems to the logic device, the purpose-built engine group switch configured to establish a plurality of communication routes based on one or more switch control signals, and wherein each route of the plurality of communication routes is established between a respective purpose-built engine and a respective connector; and a protocol discovery and assignment engine communicatively coupled to the purpose-built engine group switch and configured to monitor all possible one-wire communication paths between the purpose-built engines and the subsystems for announcements of protocol types and in response to such monitoring, communicate the switch control signals to the purpose-built engine group switch in accordance with supported communications protocols of individual purpose-built engines of the plurality of purpose-built engines.

In accordance with these and other embodiments of the present disclosure, a method may be provided for a system having a logic device interfaced between a management controller and a plurality of subsystems, wherein the logic device includes a plurality of purpose-built engines, each purpose-built engine configured to perform single-wire communication with one or more subsystems in accordance with a particular protocol associated with such purpose-built engine and a purpose-built engine group switch interfaced between the plurality of purpose-built engines and a plurality of connectors for communicatively coupling the plurality of subsystems to the logic device. The method may include establishing, with a purpose-built engine group switch, a plurality of communication routes based on one or more switch control signals, wherein each route of the plurality of communication routes is established between a respective purpose-built engine and a respective connector. The method may also include monitoring all possible one-wire communication paths between the purpose-built engines and the subsystems for announcements of protocol types. The method may further include in response to such monitoring, communicating the switch control signals to the purpose-built engine group switch in accordance with supported communications protocols of individual purpose-built engines of the plurality of purpose-built engines.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in a system having a logic device interfaced between a management controller and a plurality of subsystems, wherein the logic device includes a plurality of purpose-built engines, each purpose-built engine configured to perform single-wire communication with one or more subsystems in accordance with a particular protocol associated with such purpose-built engine and a purpose-built engine group switch interfaced between the plurality of purpose-built engines and a plurality of connectors for communicatively coupling the plurality of subsystems to the logic device: establish, with a purpose-built engine group switch, a plurality of communication routes based on one or more switch control signals, wherein each route of the plurality of communication routes is established between a respective purpose-built engine and a respective connector; monitor all possible one-wire communication paths between the purpose-built engines and the subsystems for announcements of protocol types; and in response to such monitoring, communicate the switch control signals to the purpose-built engine group switch in accordance with supported communications protocols of individual purpose-built engines of the plurality of purpose-built engines.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
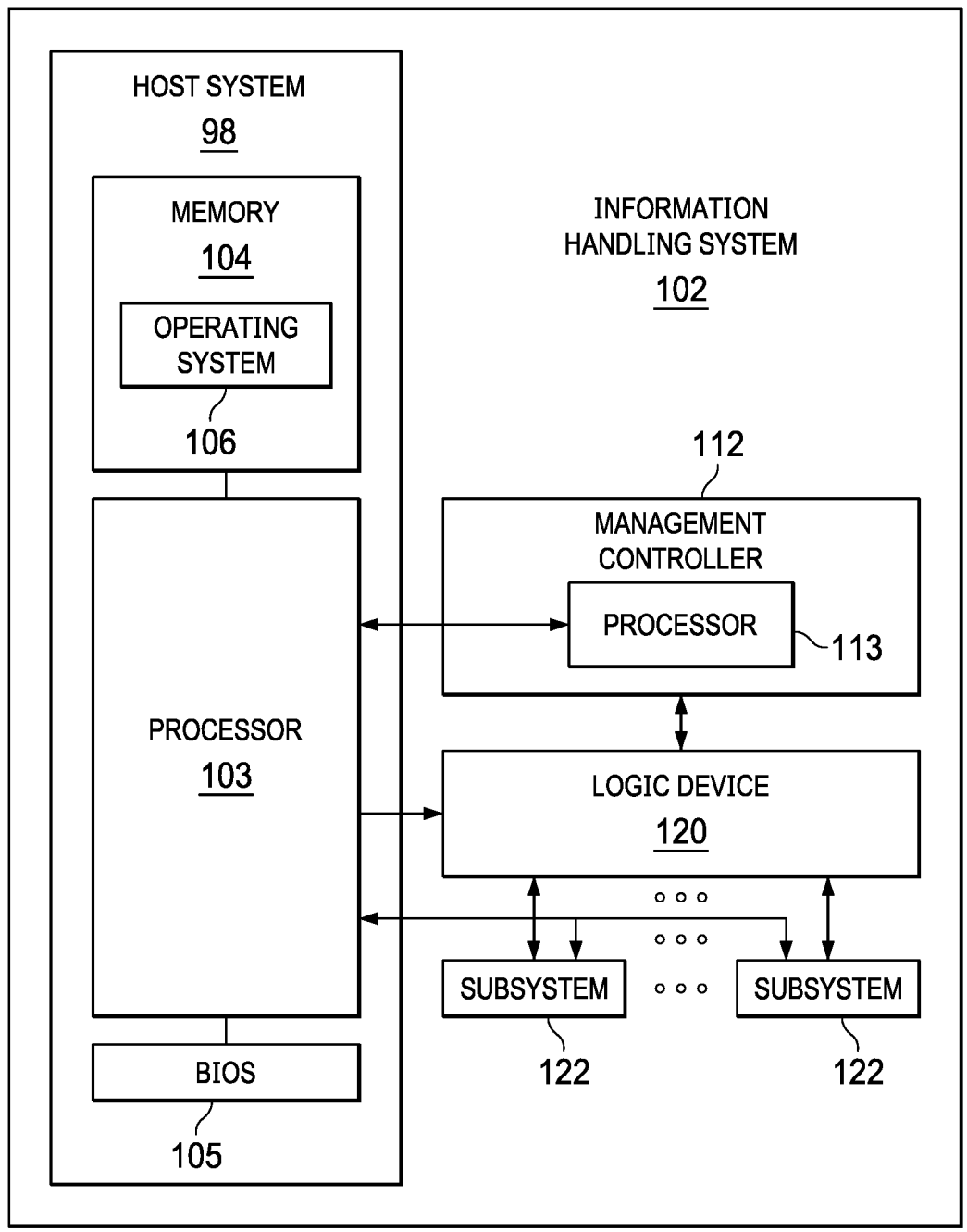
FIG. 1 illustrates a block diagram of an example information handling system, in accordance with embodiments of the present disclosure.
Figure 2:
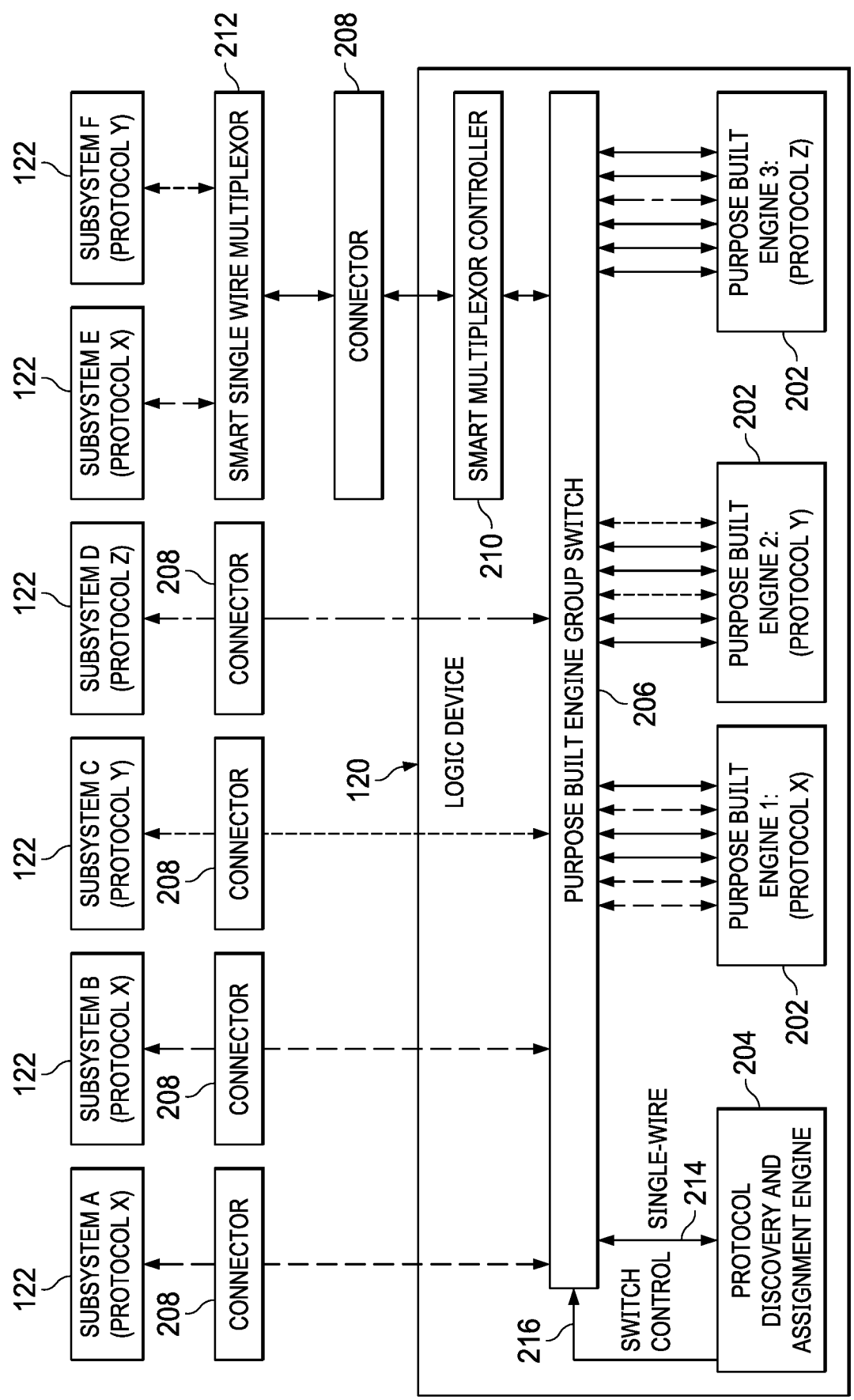
FIG. 2 illustrates a block diagram of selected components of an example logic device and example subsystems, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, and a logic device 120 communicatively coupled to processor 103, management controller 112 communicatively coupled to processor 103, a logic device 120 communicatively coupled to management controller 112, and a plurality of subsystems 122 communicatively coupled to management controller 112 via logic device 120. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments, operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state.

Management controller 112 may include a processor 113 communicatively coupled to processor 103. Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

A logic device 120 may comprise any suitable system, device, or apparatus that may perform a specialized function that extends the functionality of information handling system 102. For example, logic device 120 may serve as an interface between management controller 112 and subsystems 122 for communication of control information associated with subsystems 122 between management controller 112 and logic device 120. In some embodiments, logic device 120 may comprise a complex programmable logic device (CPLD) or a field-programmable gate array (FPGA). Details of logic device 120 may be described in greater detail below with respect to FIG. 2.

Each subsystem 122 may comprise any suitable peripheral device of information handling system 102 configured to communicate with processor 103 and perform a particular functionality of information handling system 102. A subsystem 122 may include a storage subsystem, a networking subsystem, a power subsystem, a video subsystem, an audio subsystem, or any other suitable subsystem. For purposes of exposition, two subsystems 122 are shown in FIG. 1. However, information handling system 102 may include any suitable number and type of subsystems 122.

FIG. 2 illustrates a block diagram of selected components of example logic device 120 and example subsystems 122, in accordance with embodiments of the present disclosure.

As shown in FIG. 2, each subsystem 122 may be coupled to logic device 120 via a connector 208. Each connector 208 may be of any connector type suitable to the respective subsystem 122 coupled to logic device 120 by such connector 208. Also as shown in FIG. 2, in some instances, a smart single-wire multiplexer 212 may be interfaced between a connector 208 and multiple subsystems 122, and single-wire multiplexer 212 may be configured to multiplex communication between a single connector 208 and a plurality of subsystems 122. In some embodiments, smart single-wire multiplexer 212 may be a multiplexer as described in U.S. patent application Ser. No. 17/106,434, filed Nov. 30, 2020, and incorporated by reference herein in its entirety (the '434 Application).

As also shown in FIG. 2, logic device 120 may include a plurality of purpose-built engines 202, each purpose-built engine 202 configured to perform single-wire communication with one or more subsystems 122 in accordance with a particular protocol.

As further shown in FIG. 2, a purpose-built engine group switch 206 may be interfaced between the purpose-built engines 202 and connectors 208. Purpose-built engine group switch 206 may comprise any switching entity configured to route a purpose-built engine 202 to a particular connector 208 in accordance with switch control signals received by purpose-built engine group switch 206 from protocol discovery and assignment engine 204.

As likewise shown in FIG. 2, a protocol discovery and assignment engine 204 may be coupled to purpose-built engine group switch 206 via a single-wire communication path 214 and via a switch control path 216. In operation, protocol discovery and assignment engine 204 may monitor via a single-wire communication path 214 all possible one-wire communication paths between purpose-built engines 202 and subsystems 122 for announcements of protocol type (e.g., as a result of breaks and exchanges announcing protocol type). In response to such monitoring, protocol discovery and assignment engine 204 may further communicate switch control signals via switch control path 216 to purpose-built engine group switch 206, thus routing purpose-built engines 202 to subsystems 122 in accordance with their respective supported communications protocols. Each purpose-built engine 202 may thus gain full control over all assigned connectors 208 and initiate communication with assigned subsystems in accordance with its supported protocol.

As shown in FIG. 2, logic device 120 may further include a smart multiplexer controller 210 interfaced between purpose-built engine group switch 206 and any connector 208 to which a smart single-wire multiplexer 212 is coupled. When a smart single-wire multiplexer 212 is discovered in a particular communication path, smart multiplexer controller 210 may control and arbitrate communication in order to time share communication between one or more purpose-built engines 202 and multiple downstream subsystems 122 with homogeneous or heterogeneous protocols, in accordance with teachings of the '434 Application.

The systems and methods disclosed above achieve maximum flexibility of connector types, multiple protocols, and minimal inter-board and inter-subsystems signals with the same level of full self-describing input/output capabilities including each protocol's specialized capabilities.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor;
   a management controller communicatively coupled to the host system processor and a logic device and configured to perform out-of-band management of the information handling system;
   a plurality of subsystems, each subsystem configured to perform a particular functionality of the information handling system; and
   a logic device interfaced between the management controller and the plurality of subsystems and comprising:
      a plurality of purpose-built engines, each purpose-built engine configured to perform single-wire communication with one or more subsystems in accordance with a particular protocol associated with such purpose-built engine;
      a purpose-built engine group switch interfaced between the plurality of purpose-built engines and a plurality of connectors for communicatively coupling the plurality of subsystems to the logic device, the purpose-built engine group switch configured to establish a plurality of communication routes based on one or more switch control signals, wherein each route of the plurality of communication routes is established between a respective purpose-built engine and a respective connector; and
      a protocol discovery and assignment engine communicatively coupled to the purpose-built engine group switch via a distinct single-wire communication path and via a switch control path and configured to:
         monitor, via the distinct single-wire communication path, all possible one-wire communication paths between the purpose-built engines and the subsystems for announcements of protocol types; and
         in response to such monitoring, communicate, via the switch control path, the switch control signals to the purpose-built engine group switch in accordance with supported communications protocols of individual purpose-built engines of the plurality of purpose-built engines.

2. The information handling system of claim 1, wherein the logic device further includes a smart multiplexer controller interfaced between the purpose-built engine group switch and any connector to which a smart single-wire multiplexer is coupled, the smart multiplexer controller configured to, control and arbitrate communication in order to time share communication between one or more purpose-built engines and multiple downstream subsystems coupled to the smart single-wire multiplexer.

3. A method, in a system having a logic device interfaced between a management controller and a plurality of subsystems, wherein the logic device includes a plurality of purpose-built engines, each purpose-built engine configured to perform single-wire communication with one or more subsystems in accordance with a particular protocol associated with such purpose-built engine and a purpose-built engine group switch interfaced between the plurality of purpose-built engines and a plurality of connectors for communicatively coupling the plurality of subsystems to the logic device, the method comprising:

establishing, with a purpose-built engine group switch, a plurality of communication routes based on one or more switch control signals, wherein each route of the plurality of communication routes is established between a respective purpose-built engine and a respective connector;

monitoring, by a protocol discovery and assignment engine of the logic device, via a distinct single-wire communication path between the protocol discovery and assignment engine, all possible one-wire communication paths between the purpose-built engines and the subsystems for announcements of protocol types; and in response to such monitoring, communicating, from the protocol discovery and assignment engine, via a switch control path, the switch control signals to the purpose-built engine group switch in accordance with supported communications protocols of individual purpose-built engines of the plurality of purpose-built engines.

4. The method of claim 3, wherein the logic device further includes a smart multiplexer controller interfaced between the purpose-built engine group switch and any connector to which a smart single-wire multiplexer is coupled, and the method further includes controlling and arbitrating communication in order to time share communication between one or more purpose-built engines and multiple downstream subsystems coupled to the smart single-wire multiplexer.

5. An article of manufacture comprising:
a non-transitory computer-readable medium; and
computer-executable instructions carried on the computer-readable medium, the instructions readable by a processing device, the instructions, when read and executed, for causing the processing device to, in a system having a logic device interfaced between a management controller and a plurality of subsystems, wherein the logic device includes a plurality of purpose-built engines, each purpose-built engine configured to perform single-wire communication with one or more subsystems in accordance with a particular protocol associated with such purpose-built engine and a purpose-built engine group switch interfaced between the plurality of purpose-built engines and a plurality of connectors for communicatively coupling the plurality of subsystems to the logic device:

establish, with a purpose-built engine group switch, a plurality of communication routes based on one or more switch control signals, wherein each route of the plurality of communication routes is established between a respective purpose-built engine and a respective connector;

monitor, by a protocol discovery and assignment engine of the logic device, via a distinct single-wire communication path between the protocol discovery and assignment engine, all possible one-wire communication paths between the purpose-built engines and the subsystems for announcements of protocol types; and in response to such monitoring, communicate, from the protocol discovery and assignment engine, via a switch control path, the switch control signals to the purpose-built engine group switch in accordance with supported communications protocols of individual purpose-built engines of the plurality of purpose-built engines.

6. The article of claim 5, wherein the logic device further includes a smart multiplexer controller interfaced between the purpose-built engine group switch and any connector to which a smart single-wire multiplexer is coupled, and the instructions are for further causing the processing device to control and arbitrate communication in order to time share communication between one or more purpose-built engines and multiple downstream subsystems coupled to the smart single-wire multiplexer.

* * * * *